May 8, 1962 R. H. BOOTH ET AL 3,033,458
DATA-HANDLING APPARATUS
Filed Jan. 26, 1956
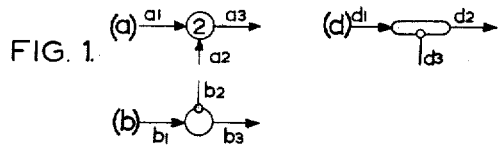
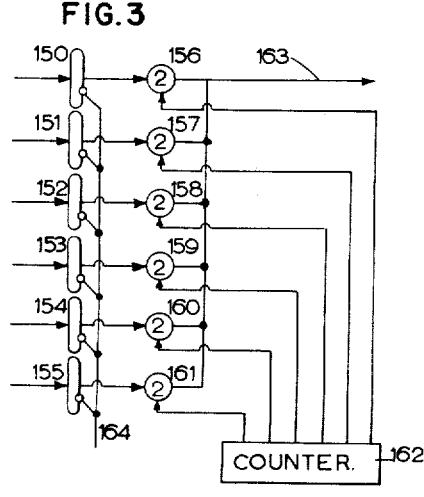
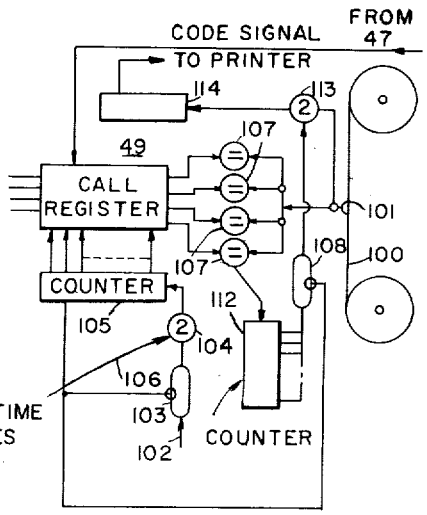
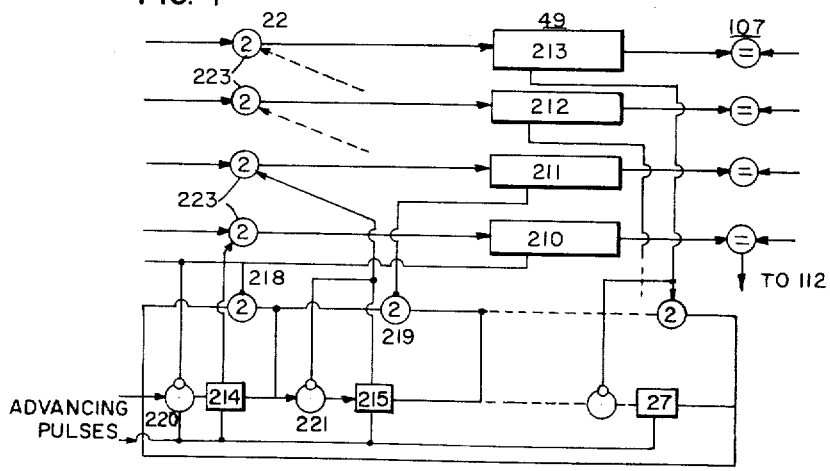
Inventors
R. H. Booth
R. E. Spencer

United States Patent Office 3,033,458
Patented May 8, 1962

3,033,458
DATA-HANDLING APPARATUS
Richard Herbert Booth, Beaconsfield, and Rolf Edmund Spencer, London, England, assignors to Electric & Musical Industries Limited, Hayes, England, a company of Great Britain
Filed Jan. 26, 1956, Ser. No. 561,629
Claims priority, application Great Britain Jan. 27, 1955
3 Claims. (Cl. 235—167)

This invention relates to data-handling apparatus.

In data-handling equipment such as used in commerce, input information is applied by manual operation of keys, or by electrical circuits made in response to keys or mark sensing devices. Acting on the information inherent in this electrical or mechanical pattern, the apparatus is required to send information directly or indirectly to a number of destinations, some of which may have to be specially selected in accordance with some of the original information, such as a serial number of an account in question. Furthermore, some of the manipulation may be dependent on other reference information available to or in the apparatus, to be selected again by some serial number or other code contained in the input information. Some computation may be required but computation as such is seldom an embarrassment compared with the main problem of manipulating the information. It is also important that the input information should be withdrawn quickly from the keys or other sensing means, so that labour costs may be maintained low.

The problems therefore arise not only of releasing the input mechanism quickly but also of completing an operation quickly because the result is needed to decide further action. This problem could be reduced by providing stores, functioning either as sources of reference data or destinations, which are accessible in the random order in which the input data happens to be fed in. Such a store is hereinafter referred to as a random access store. However, taking into account that the amount of information needed for day to day reference in a representative commercial data handling system may be of the order of tens or even hundreds of millions of so-called "bits," it will be appreciated that the provision of random access stores for all this information presents serious practical difficulties. Temporary stores of the kind which require continual regeneration of the information, such as used in digital electronic computers, are hardly practicable, since a temporary failure could lead to a loss of the stored information.

Therefore the most practicable store for the bulk of the reference information is a serial access store, and such a store must be used for information which, though it enters the operations, such as the preparation of bills, invoices or records, does not affect the manipulation of the input data up to the final stages.

A serial access store is a store from which a desired signal can be selected only by running through the sections of the store in serial order. Preferably such serial access store may be a magnetic tape store. However there then arises the problem that the access time to a serial access store may, in general, be relatively long and the manipulation of successive items may be considered to be uneconomically slow if each item has to wait until reference information is obtained from the serial access store.

The object of the present invention is to reduce some at least of the difficulties referred to in the preceding paragraphs.

According to the present invention there is provided data-handling apparatus comprising a random access store having a plurality of storage locations, a serial access store having a plurality of storage locations, each storage location of said serial access store having a reference signal space and an identification code signal space, an input device, means responsive to input information for storing in said random access store preliminary signals each at least including an identification code signal, a reading device for serially scanning successive locations of said serial access store to derive identification code signals therefrom, comparison means for comparing each identification code signal derived by said reading device from said serial access store with every identification code signal in said random access store before the derivation of the next identification code signal by said reading device from the serial access store, said comparison means for providing a gating signal in response to a desired relationship between the identification code signal derived from said serial access store and any one of the identification code signals in said random access store and means responsive to a gating signal from said comparison means for providing access to the reference signal space in the respective storage location of said serial access store.

By virtue of this aspect of the invention the operations requiring human intervention are not tied to the time pattern of the serial access store. The apparatus uses in effect what may be termed an inverse random access system.

In order that the invention may be clearly understood and readily carried into effect, the invention will be described with reference to the accompanying drawings, in which:

FIGURE 1 illustrates symbols used in the drawings to represent conventional circuit units, in order to simplify the drawings and facilitate description thereof, FIGURE 2 illustrates diagrammatically and mainly in block form or with the aid of the symbols illustrated in FIGURE 1, one example of data handling apparatus according to the present invention, FIGURE 3 illustrates one form of static register which can be used in the apparatus shown in FIGURE 2, FIGURE 4 illustrates a form of call register which can be used in the apparatus of FIGURE 2.

Referring to FIGURE 1, symbol ($a$) represents a pulse gate having input connections $a1$ and $a2$ and an output connection $a3$. The figure enclosed in the symbol denotes the threshold of the gate, the figure being 2 in the example illustrated, thereby indicating that it would require the simultaneous application of pulses to two input connections to produce the single output pulse. A suitable form of pulse gate is described in the "Proceedings of the I.R.E.," May 1950, page 511.

Symbol ($b$) denotes a pulse inhibitor gate having a normal input connection $b1$, an inhibit input connection $b2$ and an output connection $b3$. A pulse applied to $b2$ inhibits the transmission of pulses from $b1$ to $b3$. However a voltage representing a zero digit on $b1$ permits the transmission of a pulse from $b1$ to $b3$. A pulse inhibitor gate may be of similar construction to a pulse gate such as represented by symbol ($a$), with, however, one of the controls reversed.

Symbol ($c$) represents a coincidence circuit having input connections $c1$ and $c2$ and an output connection $c3$. The circuit produces an output if the inputs applied to $c1$ and $c2$ are simultaneously of the same polarity or simultaneously zero. A suitable form of coincidence circuit is illustrated in Automatic Digital Calculators by A. D. and K. V. H. Booth, page 112, Figure 11.10.

Symbol ($d$) denotes a two state device having an input connection $d1$, an output connection $d2$ and an inhibitor connection $d3$. When the device is in one state, state "0," a signal on the connection $d1$ changes the device to the state "1," the device remaining in that state until a signal is applied by the inhibitor connection $d3$, whereupon the device reverts to state "0." In state "1" of the device, the output connection $d2$ is energised. A two state device such as indicated by symbol ($d$) can be realised by means of an Eccles-Jordan circuit.

For the purposes illustrating the invention, a relatively simple apparatus has been shown in FIGURE 2 and it will be assumed to form part of a larger apparatus for automatically preparing invoices in response to orders received from customers. It will be assumed that the orders are entered in the apparatus in the form of a message consisting of the customers code number alternatively referred to as identification code signals, the quantity ordered, and a code number for the product ordered.

It will be assumed that from time to time a demand arises for the customer's name and address and any other necessary invoice particulars in order to complete the information which has to be entered on the invoice. The customers' particulars will be assumed to constitute the major part of the information which has to be stored in the apparatus and for this reason it is stored in a magnetic tape store represented diagrammatically by the reference 100. The particulars of the customers are stored in serial order according to the customers' code numbers and the store 100 therefore constitutes a serial access store the access time of the operational rate of the other parts of the apparatus which are not shown. The invention aims at making the operation of the said other part of the apparatus in no way restricted by the access time to the store 100. A call register 49 is arranged to have sufficient sections to accommodate all identification code signals which may be fed from the other parts of the apparatus during the time required to gain access to the store 100. Thus the tape 100 has an identification code signal space and a reference signal space associated with each identification code signal. Each customer's particulars are recorded in one of the reference signal spaces. The store 100 has a reading head 101 and it will be assumed that timing pulses are available corresponding to the time when the beginning of each customer's code signal on the store 100 passes the reading head 101. These timing pulses are applied by a connection 102 to a two state device 103 to set it in "state 1." The device 103 then energises a threshold-two gate 104 and allows digit time pulses to be applied to a counter 105 from a connection 106. It will be understood that these digit time pulses will occur at a rate appropriate to the rate of travel of the tape 100, which rate may differ from that of the digit time pulses for other parts of the apparatus. Store 100 will be different than that of the drum stores. The counter 105 is arranged to generate pulses which dynamicises all customers code signals stored in the call register 49 as will be explained subsequently with reference to FIGURE 3. A co-incidence circuit is provided corresponding to each call register section and four such co-incidence signals are indicated by the references 107, which would infer four sections in the register. In practice, of course, the number of sections may be much greater, the number being sufficient to store all calls likely to arrive in the average access time to the store 100. Each co-incidence circuit is associated with a counter but only the counter 112 associated with one co-incidence circuit 107 is shown. Each time a digit of a code signal from the store 100 is the same as the corresponding digit of the code signal from a section of the call register, the respective co-incidence circuit generates a pulse which is fed to the respective counter, say 112, and if identity is established between a code signal from store 100 and a code signal in the corresponding section of the register, the counter 112 will register the number of digits in the code signal when the reference signal space has passed the head 107. Thus, only if identity is established between all the corresponding digits of the code signals from the call register 49 and from the tape store 100, the counter 112 will register a count equal to the number of digits in the code signal. Since the sections of the call register 49 have capacity only for an identification code signal, no further signals will be applied therefrom to the coincidence circuit 107, after the code signal space has passed the reading head 101, so that any counter 112, which does not register a count equal to the number of digits in a code signal, cannot continue that count at any subsequent time while the reference signal is passing the reading head 101. Of course a new comparison is started when the next code signal in 100 reaches the head 101. In these circumstances, that is when a count equal to the number of digits in the code signal is registered, that counter is arranged to provide an output pulse which energises a gate 113 via a two state device 108 to allow the remainder of the signals stored in the corresponding section of the store 100 to be fed to a static register 114. When all the information in the selected section of the store 100 has been read transferred to the register 114, the counter 105 closes the gates 104 and 113 by changing the devices 103 and 108 to the "zero" states. The counter 105 receives digit time pulses derived from the tape store 100 and the counter has sufficient stages to count the number of digits comprising an identity code signal and the associated reference information. The counter 105 receives digit time pulses via the gate 104, opened by the device 103 being set in "state 1" in response to the basic time pulses from a master generator, which denotes that an identification code signal has reached the head 101, and continues to count a prescribed number of pulses corresponding to the duration of the reference information derived from the tape store 100. When the counter 105 registers a prescribed number of digit time pulses it reaches the counter full state and provides an output pulse. This output pulse resets the devices 103 and 108 to the "state 0" and thereby terminates the transfer of information from the tape store 100 to the register 114. Finally the corresponding section of the call register 49 is cleared, say by a signal from the static register 114, when empty this signal being applied in parallel to all stages of the call register section to change these stages to state "zero," in well-known manner. It is of course necessary to have a static register 114 for each section of the call register.

This necessity arises because the rate at which digits, stored in the register 114, can be accepted by the printer may be considerably slower than the rate of digit transfer to the register 114 from the serial access store 100, and it may be desirable to make further comparisons between identification code signals in the random access or call store 49 and the serial access store 100 whilst the register 114 is still occupied in transferring its contents to the printer. Possible constructions for other parts of the apparatus are illustrated in FIGURES 3 and 4.

FIGURE 3 illustrates a static register which may be dynamicised at the desired time. This register may comprise any one section of the call register 49. It comprises a group of two state devices 150 to 155, one for each binary code signal to be staticised (there may be many more than six). The signals to be staticised are applied to the corresponding two state devices and if the signal represents a digit of value 1 the corresponding device is changed to state "1." The outputs of the two state devices are applied to a series of gates 156 to 161 which, when the staticised signal has again to be dynamicised, are energised in succession by pulses from a counter 162 which counts digit-time pulses. If FIGURE 3 represents a section of the call register 49, then counter 162 may be identical with part of counter 105, indeed that part comprising the first stages of the register 105, the number corresponding to the number of stages in each section of the call register. The dynamicised signals appear in serial form on the output highway 163. The register can be re-set by a single signal applied to the reset connection 164 which may come from the counter 162 or other source. The arrangements shown in FIGURE 3 may, for example, be used also for the register 114, but the input signals representing successive pulses have to be applied in succession to the two state devices by gates similar to 156 to 161. Thus, the input circuit for the two state devices 150 to 155 would be a mirror image of the arrangement comprising the two gates 156 to 161 and the counter 162. The serial input pulse train, wherein the successive pulses represent the value "0" or "1" of successive binary digits, the first pulse corresponding to $2^0$ the second to $2^1$ and so on, is applied simultaneously to all the input two gates. These gates are opened sequentially in response to pulses at digit time from a counter similar to that shown by the reference 162. Thus, the "two gate" providing entry to each of said devices, corresponding to a binary digit, is opened at a time coinciding with the arrival of the corresponding pulse, and is closed before the arrival of the next pulse. This procedure is well known to those skilled in the art. Such a register can obviously be used for changing the time scale of the digits and may consequently be used for the register 114. It is also possible to feed from groups of the two state devices in parallel, each group being a binary-decimal code group, which expedient can be adopted for feeding from a register such as 114 to the printer.

In FIGURE 4 a suitable construction of the call register is indicated, only four sections 210 to 213 of the register being illustrated. Each of these sections may consist as aforesaid of a static register such as shown in FIGURE 3. The entry of customer code signals to the sections is controlled by a ring counter consisting of two state devices 214 to 217 etc., one device for each section of the register. The devices are by-passed by threshold-two gates 218, 219 etc. and inhibitor gates 220, 221 etc. are disposed as shown in the couplings between successive devices. The ring counter is advanced by a unit step after the filling of any sections of the call register. If any section of the register is occupied it is arranged to send a signal to the corresponding gate in the series 218, 219 etc. and an inhibiting signal to the corresponding inhibitor gate 220, 221, etc. This virtually removes the corresponding two state device from the ring counter. The ring counter will therefore always settle with the energised two state devices corresponding to an unoccupied section of the register. The two state devices of the ring counter control entry gates 223 for the call register section, and may also control entry gates for the tracks of a buffer store for other information connected with a code signal applied to the call register 49. Only one gate 223, for each section of 49, is shown for convenience of illustration, though if the sections are as shown in FIGURE 3 a gate in each input lead is obviously necessary.

The pulses used for controlling the operation of the apparatus may be derived in known manner from a master pulse generator.

In operation of the apparatus described detection of a counter "full" or "empty" state or some other predetermined state is required and this may be effected by means of a coincidence device for example of the following construction. A number of diode rectifiers have their cathodes connected to output points of each of the relevant stages of the counter. The anodes of all the rectifiers are connected through a common resistor to a positive potential source and the arrangement is such that so long as one or more of the rectifiers is in the conducting condition the potential at the connected electrodes of the rectifiers has a low value. Moreover, a rectifier is maintained conducting so long as the output potential in any stage of the counter is at a low value. However when the counter is full the output potential of all the stages is high and a high potential is thereupon established at the connected electrodes at the diode rectifiers.

It will be noted that in the apparatus, large quantities of standing information are carried on tape rather than on drums, the transaction information is set aside, as it arises, into an address where it can be reached at random, with an access time short compared with the time of printing out the information involved, when a call on it is initiated by the main storage tape, that is by inverse random access method.

The invention may of course be applied to a wide variety of business transactions. For example, it may be applied to data-handling in a mail order business, such a business having, say, then thousand agents remitting and ordering about once per week an average of ten items from a catalogue of a thousand items.

In order to reduce the access time to a serial access store used in apparatus according to the invention, means may be provided for giving access by a combination of serial and random access methods. For example, a serial access store may comprise a magnetic tape on which items are recorded on a plurality of parallel longitudinally extending tracks, or so-called "columns," items in different columns being arranged one above the other to form rows. To gain access to a particular item, means are provided for scanning the rows in serial order until a signal is obtained indicating that the row containing the desired item has been reached. Thereupon, under control of a reference signal, the desired item is selected from the row by direct random access. This could be achieved by traversing the pick-up head at right angles to the direction of traverse during the serial scanning operation until the head registers with the desired column. Alternatively, a bank of heads may be used one corresponding to each column, associated with gates for controlling the signals picked up by the respective heads, and when the desired row is reached, the desired item is selected from the appropriate column by opening the gate associated with the corresponding head.

What we claim is:

1. Data-handling apparatus comprising a call store having a plurality of storage locations, a serial access store having a plurality of storage locations the number of storage locations in said serial access store exceeding in number in said call store, each storage location of said serial access store having a reference signal space and an identification code signal space, an input device, means responsive to input information for storing in said call store preliminary signals each at least including an identification code signal, different prelimanry signals being stored in different locations of said call store, a reading device for serially scanning successive locations of said serial access store to derive identification code signals therefrom, comparison means for comparing each identification code signal derived by said reading device from said serial access store with every identification code signal in different locations of said call store before the derivation of the next identification code signal by said reading device from the serial access store, said comparison means for providing a gating signal in response to a desired relationship between the identification code signal derived from said serial access store and any one of the identification code signals in said call store and means responsive to a gating signal from said comparison means for providing access to the reference signal space in the respective storage location of said serial access store.

2. Apparatus according to claim 1, comprising an output device, means responsive to a gating signal from said comparison means to connect said serial access store to said output device.

3. Apparatus according to claim 1, said comparison means comprising a comparison device associated with each storage location of said call store.

References Cited in the file of this patent

UNITED STATES PATENTS

| | | |
|---|---|---|
| 2,540,654 | Cohen | Feb. 6, 1951 |
| 2,604,262 | Phelps | July 22, 1952 |
| 2,609,143 | Stibitz | Sept. 2, 1952 |

(Other references on following page)

UNITED STATES PATENTS

| | | |
|---|---|---|
| 2,611,813 | Sharpless et al. | Sept. 23, 1952 |
| 2,614,169 | Cohen | Oct. 14, 1952 |
| 2,636,672 | Hamilton et al. | Apr. 28, 1953 |
| 2,679,638 | Bensky | May 25, 1954 |
| 2,721,990 | McNaney | Oct. 25, 1955 |
| 2,737,342 | Nelson | Mar. 6, 1956 |
| 2,771,595 | Hendrickson et al. | Nov. 20, 1956 |
| 2,797,862 | Andrews et al. | July 2, 1957 |
| 2,831,179 | Wright et al. | Apr. 15, 1958 |
| 2,910,238 | Miles et al. | Oct. 27, 1959 |

OTHER REFERENCES

"A Functional Description of the EDVAC," Moore School of Engineering (deposited in Patent Office May 3, 1951), vol. I, pages 1.2, 4–1, 5–1; vol. II, FIGS. 104–10LD–6, 104–10LD–2.